(12) United States Patent
Petillon et al.

(10) Patent No.: US 9,919,707 B2
(45) Date of Patent: Mar. 20, 2018

(54) METHOD FOR CONTROLLING THE SHUTDOWN OF A HEAT ENGINE

(71) Applicant: RENAULT s.a.s., Boulogne-Billancourt (FR)

(72) Inventors: Yohann Petillon, Montigny le Bretonneux (FR); Bertrand Nodin, Igny (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 15/126,211

(22) PCT Filed: Feb. 4, 2015

(86) PCT No.: PCT/FR2015/050270
§ 371 (c)(1),
(2) Date: Oct. 13, 2016

(87) PCT Pub. No.: WO2015/136167
PCT Pub. Date: Sep. 17, 2015

(65) Prior Publication Data
US 2017/0080944 A1    Mar. 23, 2017

(30) Foreign Application Priority Data

Mar. 14, 2014    (FR) ..................................... 14 52141

(51) Int. Cl.
*B60W 10/02* (2006.01)
*B60W 10/06* (2006.01)
(Continued)

(52) U.S. Cl.
CPC ...... *B60W 30/18072* (2013.01); *B60W 10/02* (2013.01); *B60W 10/04* (2013.01);
(Continued)

(58) Field of Classification Search
CPC ................ B60W 10/02; B60W 10/06; B60W 30/18018; B60W 30/18072; B60W 30/181
See application file for complete search history.

(56) References Cited

U.S. PATENT DOCUMENTS

| | | | | |
|---|---|---|---|---|
| 8,437,929 | B2 * | 5/2013 | Suzuki .................. | B60W 10/02 701/51 |
| 2002/0074173 | A1 * | 6/2002 | Morimoto .............. | B60K 6/485 180/65.26 |
| 2013/0296121 | A1 * | 11/2013 | Gibson ................. | F02D 41/022 477/5 |

FOREIGN PATENT DOCUMENTS

| | | |
|---|---|---|
| EP | 2 301 317 A1 | 3/2011 |
| FR | 2 873 753 A1 | 2/2006 |

OTHER PUBLICATIONS

French Search Report dated Nov. 7, 2014 in FR 1452141 Filed Mar. 14, 2014.

(Continued)

*Primary Examiner* — Edwin A Young
(74) *Attorney, Agent, or Firm* — Oblon, McClelland, Maier & Neustadt, L.L.P.

(57) ABSTRACT

A method for controlling a vehicle power train that includes a heat engine connected to the transmission of the vehicle by a clutch controlled between an open position and a closed position of the transmission by a computer of the transmission exchanging information with a computer of the heat engine. The method includes sending, in order to shut down the engine before the clutch is opened when the vehicle is in motion, the kinematic chain being closed and the injection interrupted, a message from the computer of the transmission to the computer of the engine at a first moment in time so as to synchronize an opening of the clutch and the closure (Continued)

of an air flap of the engine at a second moment in time subsequent to the first moment.

4 Claims, 2 Drawing Sheets

(51) Int. Cl.
    *B60W 30/18*     (2012.01)
    *F02D 41/02*     (2006.01)
    *F02D 41/04*     (2006.01)
    *B60W 10/04*     (2006.01)
    *F02D 9/10*     (2006.01)
    *F02D 41/08*     (2006.01)
    *B60K 6/20*     (2007.10)
    *F02N 11/08*     (2006.01)
    *F02D 41/00*     (2006.01)

(52) U.S. Cl.
    CPC ...... *B60W 10/06* (2013.01); *B60W 30/18018* (2013.01); *F02D 9/10* (2013.01); *F02D 41/022* (2013.01); *F02D 41/042* (2013.01); *F02D 41/08* (2013.01); *B60K 6/20* (2013.01); *B60W 30/181* (2013.01); *F02D 2041/0095* (2013.01); *F02D 2250/12* (2013.01); *F02N 11/0814* (2013.01); *F02N 2300/2011* (2013.01); *F02N 2300/304* (2013.01)

(56) References Cited

OTHER PUBLICATIONS

International Search Report dated Jun. 15, 2015 in PCT/FR2015/050270 Filed Feb. 4, 2015.

\* cited by examiner

METHOD FOR CONTROLLING THE SHUTDOWN OF A HEAT ENGINE

BACKGROUND

The present invention relates to the control of power trains (PT), in particular vehicle power trains, formed of at least one heat engine associated with an automatic or automated transmission, and possibly an electric traction machine.

More precisely, the invention relates to a method for controlling a vehicle power train comprising a heat engine connected to the transmission of the vehicle by a clutch controlled between an open position and a closed position of the transmission by a transmission computer, which exchanges information with the computer of the heat engine so as to close the air flap of the engine and disconnect the engine from the transmission when the vehicle is in motion.

This invention is applied preferably, but not exclusively, to any vehicle provided with the function of automatic engine stopping and restarting at standstill (stop and start) and with the function of transmission disconnection when the vehicle is in motion (coasting stop or sailing). This vehicle can advantageously be provided with an automatic or automated transmission integrated in a hybrid PTG.

The stop and start (S&S) system, which is present in numerous vehicles, significantly increases the number of times the heat engine is stopped and restarted during a journey. In some applications, referred to as "micro hybrids", the addition of targeted electric power machines makes it possible to additionally introduce new functions intended to reduce further still the fuel consumption by stopping the engine as soon as there is no longer any need for traction, including when the vehicle is in motion. These new control strategies also result in a significant increase in the number of times the engine is shut down and restarted, which is almost trebled in this case. In the case of such vehicles, it is paramount that the shutdown and restart phases of the heat engine are virtually imperceptible to the users of the vehicle, i.e. the driver and passengers.

BRIEF SUMMARY

The present invention aims to improve the quality of the engine shutdown for vehicles provided with the stop and start function and benefitting from the coasting stop or sailing functions, in which the transmission is disconnected when the vehicle is in motion.

With this objective, the invention proposes that the shutdown of the heat engine when the vehicle is in motion occurs before the opening of the clutch, such that the clutch opens at the same time as the air flap of the engine closes.

The computer of the transmission preferably sends a message to the computer of the engine at a first moment in time so as to synchronize the opening of the clutch and the closure of the engine flap at a second moment in time subsequent to the first.

BRIEF DESCRIPTION OF THE DRAWINGS

The invention will be better understood upon reading the following description of a non-limiting embodiment thereof, which is provided with reference to the accompanying drawings, in which.

DETAILED DESCRIPTION

In order to provide a quality engine shutdown, with a significant reduction of the vibrations felt by the driver, it is necessary for the closure of the air flap and the interruption of the injection to be performed simultaneously. The dynamic of the two actuators, however, is not the same: 300 ms (milliseconds) between the order to close and the actual closing of the air flap, and practically instantaneous interruption of the injection. It is therefore necessary to provide the order to close the flap before the order to interrupt injection.

Figure 1:
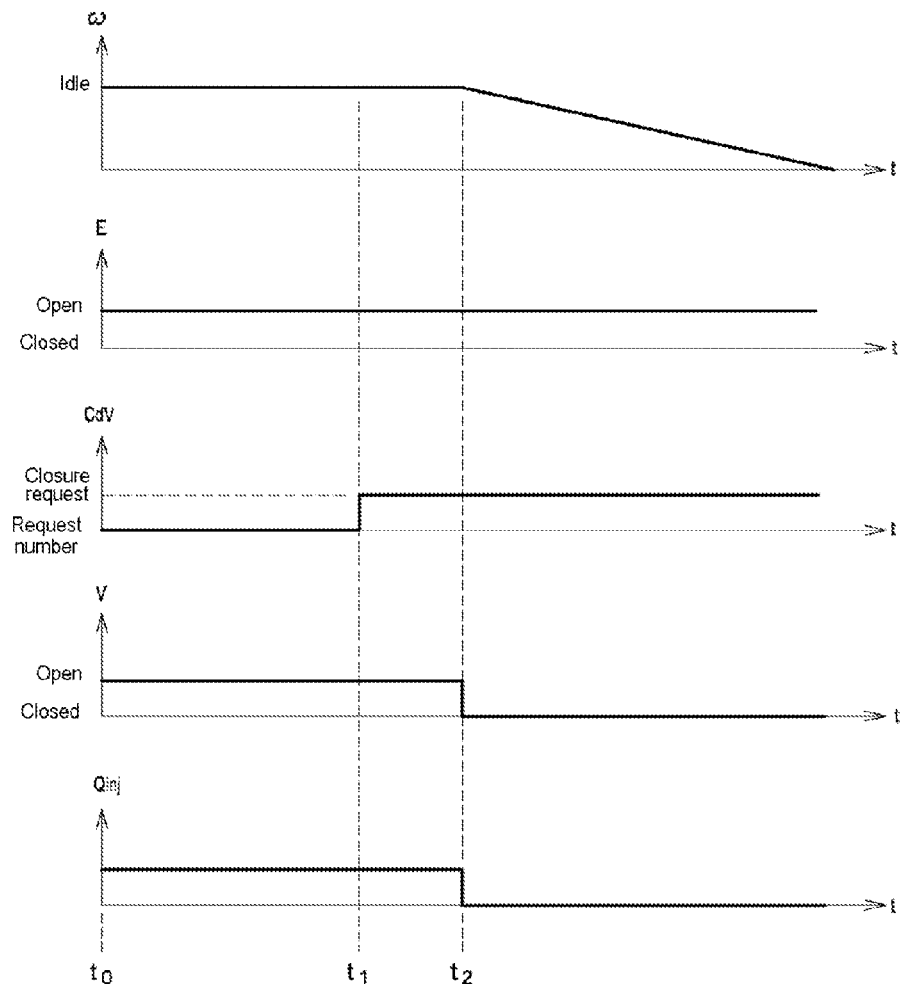
FIG. 1 shows a sequence of preparation for the shutdown of the engine when the vehicle is stopped.

In order to prepare the shutdown of the engine when the vehicle is stopped, with its kinematic chain open (clutch open) and an injection of fuel set so as to maintain the idling speed, the sequence of operations can correspond to that in FIG. 1, which shows (from the top down) the variation as a function of time, of the engine speed $\omega$, the state of the clutch E, the control of the air flap of the engine $C_dV$, the state of the air flap V, and the amount of fuel injected $Q_{inj}$.

The clutch does not change state during the operation, since it remains open and the closure of the air flap is ordered in advance at $t_1$, the injection of the fuel $Q_{inj}$ being maintained at its idle level until $t_2$ (subsequent to $t_1$), this being the time at which the air flap of the engine is closed. These two events are thus made to coincide so as to make the stopping of the engine almost imperceptible. The injection of the fuel is maintained after the request to close the air flap so as to make said injection coincide with the actual closure of the air flap.

As indicated above, with the coasting stop or sailing functions, the stopping of the engine and the opening of the transmission can be triggered automatically as the vehicle is in motion when there is no longer any need for traction. The engine can thus be stopped when the vehicle is in motion, the kinematic chain being closed and the injection interrupted. The rotation of the engine is still assured by the inertia of the vehicle because the clutch E is closed. The clutch E must be opened so as to free the engine from the kinematic chain. It is necessary to coincide the closure of the air flap V with the opening of the clutch E (whilst keeping the injection interrupted). The dynamic of the opening of the clutch (~100 ms) is also quicker than the closure of the air flap V. It is necessary to order this closure in advance. A new exchange of information between the two computers, relating to the imminent opening of the transmission, is introduced. In addition to the information regarding the state of the clutch E (open/closed), the signals transmitted between the two computers include information regarding the impending opening of the transmission.

Figure 2:
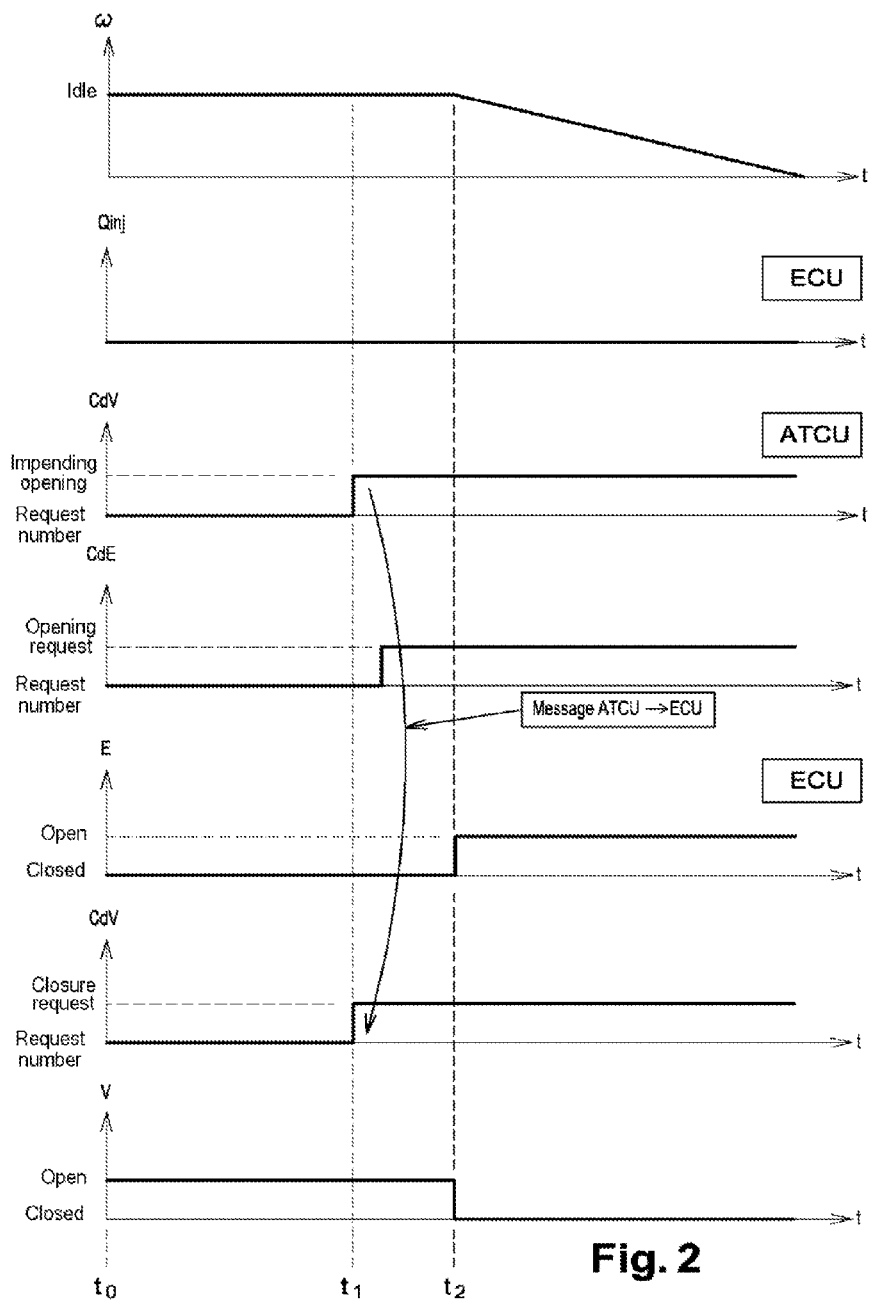
FIG. 2 shows a sequence of preparation for the shutdown of the engine when the vehicle is in motion.

The sequence of preparation for the shutdown to control a PTG comprising a heat engine connected to the transmission of the vehicle by a clutch controlled between an open position and a closed position of the transmission by a transmission computer ATCU exchanging information with the computer of the heat engine ECU is illustrated by FIG. 2.

This sequence is constructed so as to be able to interrupt the injection $Q_{inj}$, close the air flap V, and disconnect the engine from the transmission when the vehicle is in motion. At $t_0$ the vehicle is in motion, the kinematic chain is closed, and the injection has already been interrupted. ACTU sends a message to ECU at $t_1$ so as to synchronize the opening of the clutch and the closure of the flap V at $t_2$. A control signal in advance of the opening of the clutch is sent by ACTU to ECU at $t_1$ so as to warn ECU of the imminent opening of the clutch and prepare the shutdown of the engine by triggering instantaneously the closure of the air flap. ACTU then orders the opening of the clutch. Lastly, at $t_2$, the signal for the state of the clutch E marks the opening thereof, simultaneously to the closure of the air flap. In summary, $t_1$ marks the triggering of the closure of the air flap and the warning of ECU by ACTU so as to synchronize the opening of the clutch with the closure of the air flap. $t_2$ marks the closure of the air flap and the opening of the clutch. The request to open the clutch is sent to the clutch by ACTU between $t_1$ and $t_2$.

The shutdown of the heat engine is implemented before the opening of the clutch, such that the opening of the clutch occurs at the same time as the closure of the air flap of the engine. At $t_2$, the transmission is disconnected from the engine. The engine shuts down gradually. If, at the start of the sequence, the engine speed is at the idling speed, it falls gradually to zero from $t_2$ marking the disconnection of the transmission and the engine.

In conclusion, the invention proposes shutting down the engine before opening the clutch so as to provide a high-quality coasting stop or sailing function of the transmission, in which the transmission is disconnected when the vehicle is in motion, with little vibration or sound, when the injection has already been interrupted. If, by contrast, the shutdown of the engine is triggered when the vehicle has already stopped with its transmission open (stop and start function), the injection of the fuel is maintained after the request to close the air flap so as to make the interruption of said injection coincide with the closure of the flap.

The invention claimed is:

1. A method for controlling a vehicle power train comprising a heat engine connected to a transmission of the vehicle by a clutch controlled between an open position and a closed position of the transmission by a computer of the transmission exchanging information with a computer of the heat engine, the method comprising:
sending, in order to shut down the engine before the clutch is opened when the vehicle is in motion, the clutch being closed and an injection of fuel being interrupted, a message from the computer of the transmission to the computer of the engine at a first moment in time so as to synchronize an opening of the clutch and a closure of an air flap of the engine at a second moment in time subsequent to the first moment.

2. The control method as claimed in claim 1, wherein a request to open is sent to the clutch between the first moment and the second moment.

3. The control method as claimed in claim 1, wherein the shutdown of the engine and the opening of the transmission are triggered automatically as the vehicle is in motion when there is no longer any need for traction.

4. The control method as claimed in claim 1, wherein, to prepare the shutdown of the engine when the vehicle is stopped with the clutch open and the injection of fuel set so as to maintain an idling speed, the injection of the fuel is maintained after the request to close the air flap so as to make an interruption of said injection coincide with a closure of the air flap.

* * * * *